United States Patent [19]
Dobson

[11] 3,944,597
[45] Mar. 16, 1976

[54] ESTERS OF TETRAHALO-OCTANOLS

[75] Inventor: Kenneth Rowland Dobson, Epsom Downs, England

[73] Assignee: BP Chemicals International Limited, England

[22] Filed: Feb. 10, 1975

[21] Appl. No.: 548,556

Related U.S. Application Data

[63] Continuation-in-part of Ser. No. 387,951, Aug. 13, 1973, Pat. No. 3,890,375.

[30] Foreign Application Priority Data

Aug. 25, 1972   United Kingdom............... 39644/72

[52] U.S. Cl. ........ 260/488 F; 260/31.2 R; 260/487; 260/491; 260/497 A; 260/652 R
[51] Int. Cl.$^2$ .................... C07C 69/14; C07C 69/24; C07C 69/63

[58] Field of Search ......................... 260/488 F, 487

[56] References Cited
UNITED STATES PATENTS

| | | | |
|---|---|---|---|
| 2,425,426 | 8/1947 | Joyce................................ | 260/488 F |
| 2,644,835 | 7/1953 | Ladd et al. ...................... | 260/488 F |

OTHER PUBLICATIONS

Chem. Abstracts, 72: 42686v.
Chem. Abstracts, 55; 379f.

*Primary Examiner*—Vivian Garner

[57] ABSTRACT

The present invention relates to novel halogenated derivatives of esters of linear $C_8$ alcohols and aliphatic monocarboxylic acids and a process for the preparation of such compounds.

7 Claims, No Drawings

ESTERS OF TETRAHALO-OCTANOLS

CROSS-REFERENCE TO RELATED APPLICATION

The present application is a continuation-in-part of my copending application Ser. No. 387,951, filed Aug. 13, 1973, now U.S. Pat. No. 3,890,375, entitled "Chemical Compound and Process," which is incorporated herein by reference thereto.

The present invention relates to novel halogenated derivatives of esters of linear $C_8$ alcohols.

Accordingly the present invention comprises esters of linear $C_8$ alcohols of the general formula:

  (I)

or

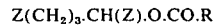  (II)

wherein
Z is $XCH_2.CHX-$,
and $Z^1$ is $-CHX.CHX-$,
and X is Cl or Br,
and R is hydrogen or a monovalent saturated aliphatic radical.

Preferably, R is hydrogen or lower alkyl.

Specific examples of such compounds are 2,3,7,8-tetrachloro-1-octyl acetate and 2,3,7,8-tetrachloro-1-octyl propionate.

The carboxylic acid moiety in the ester group is derived from a saturated aliphatic monocarboxylic acid, preferably an alkanoic acid of one to seven carbon atoms. Thus, when formic acid is used as the alkanoic acid, R is hydrogen, and when an alkanoic acid of two to seven carbon atoms is employed, R is lower alkyl. Suitable alkanoic acids have straight or branched chains and include formic acid, acetic acid, propionic acid, 2-methyl or 3-methyl butanoic acid, hexanoic acid, etc.

According to a further aspect of the present invention, a process for preparing compounds of the formula (I) or (II) as hereinbefore defined comprises reacting in the liquid phase an octodienyl ester with halogen at ambient temperatures.

By the term "halogen" is meant throughout the specification chlorine or bromine.

By the term "linear $C_8$ alcohols" it is meant throughout the specification that the carbon chain in the alcohol is linear. Thus the hydroxyl group of the alcohol could be in the 1- or 3-position of the carbon chain.

By the term "lower alkyl" it is meant throughout the specification a monovalent saturated straight or branched hydrocarbon chain of one to six carbon atoms.

The octodienyl ester may suitably be prepared by reaction in the liquid phase butadiene with a carboxylic acid in the presence of a Group VIII metal catalyst as described in British Patent Specification No. 1,274,072. The techniques used for this stage should be well known to a person skilled in the art.

The carboxylic acid moiety in the ester grouping is derived from a saturated aliphatic monocarboxylic acid. These acids may contain in addition inert substituents, e.g. halogens or alkyl groups, in the aliphatic chain. Suitable examples of carboxylic acids which may be used are described above.

The product from the above esterification reaction is a mixture of 1- and 3-octadienyl monoesters.

The mixture of 1- and 3-octadienyl esters thus obtained may be used for the halogenation step after separation from the catalyst solution by liquid/liquid extraction and removal of volatile olefins by distillation. The halogenation is carried out in the liquid phase by dissolving the octadienyl esters in a solvent. The solvents used for this purpose should preferably be more volatile than the esters and be inert to halogen, e.g. a halogenated hydrocarbon such as carbon tetrachloride or chloroform. Basic solvents such as pyridine may also be present. The appropriate halogen gas, e.g. chlorine, is then passed through the solution of the octadienyl esters.

The halogenation may be carried out in the dark and/or in the presence of a free radical inhibitor such as tertiary butyl catechol or oxygen. It may also be carried out in the presence of a Lewis acid such as ferric chloride.

The halogenation step may be carried out at ambient temperatures. By "ambient temperatures" is meant temperatures below 60°C, suitably below 40°C.

The halogenation step may be carried out at atmospheric, super-atmospheric or sub-atmospheric pressures.

The mixture of saturated halogenated derivatives thus obtained is then recovered by removal of the solvent and halogen by distillation under reduced pressure, of by liquid/liquid extraction, drying and removing the solvent by distillation.

The esters of linear $C_8$ alcohols described here may be used as plasticizers in polymeric material such as PVC, as components of lubricants and in heat exchange fluids.

The invention is further illustrated with reference to the following Examples:

EXAMPLE 1

2,7-octadien-1-yl acetate (16.8g; 0.10 mole) was dissolved in carbon tetrachloride (100 ml) and the solution cooled below 0°C by means of a cooling coil. A slow stream of oxygen was passed through the solution and the glass vessel covered with aluminium foil to exclude light. Chlorine was passed into the solution for 1.5 h at such a rate (90 ml. min$^{-1}$) that, with cooling, the temperature did not rise above 0°C. The reaction solution was washed with an aqueous solution of sodium sulphate/sodium bicarbonate, water (twice), and dried over magnesium sulphate. The residue remaining after removal of the carbon tetrachloride under reduced pressure was steam stripped at 70°C for 15 h and then vacuum stripped at 70°C for 6h. The reaction product (23g) was analysed on a 1 foot × ½ inch 5% silicone gum rubber on chromosorb W column. Three products were present in amount greater than 5 area per cent on the gas liquid chromatograph chart. The product distribution observed was:

| GC Peak | Compound | % |
| --- | --- | --- |
| A | 1,2,3,7,8-pentachlorooctane | 17 |
| B | 1,3,7,8-tetrachloro-2-octyl acetate | 19 |
| C | 2,3,7,8-tetrachloro-1-octyl acetate | 39 |
| D | Several minor components | 25 |

1,2,3,7,8-Pentachlorooctane

Peak A was separated by solid liquid chromatography. Mass spectral analysis was consistent with the formula $C_8H_{13}Cl_5$. The neculear magnetic resonance spectrum of 1,2,3,7,8-pentachlorooctane in $CDCl_3$ was as follows:

```
         a      b c   d e f g  h
        CH₂ClCHClCH₂CH₂CH₂CHClCHClCH₂Cl
                     τ (tau)          Area
        H a b f g h  5.4–6.7 (m)      7H
        H c d e      7.5–8.8 (m)      6H
```

$C_8H_{13}Cl_5$ requires: C, 33.5%; H, 4.57%; Cl, 61.9%. Found: C, 33.6%; H, 4.39%; Cl, 63.2%.

1,3,7,8-tetrachloro-2-octyl acetate

Peak B was separated by solid liquid chromatography followed by preparative gas liquid chromatography. Mass spectral analysis was consistent with the formula $C_{10}H_{16}O_2Cl_4$. The nuclear magnetic resonance spectrum ob 1,3,7,8-tetrachloro-2-octyl acetate appeared as follows:

```
                              i
                            OCOCH₃
         a     b c   d e f  |g  h
        CH₂ClCHClCH₂CH₂CH₂CHClCHCH₂Cl
                     τ (tau)          Area
        H g          4.85 (m)         1H
        H a b f h    5.6–6.6 (m)      6H
        H i          7.87 (S)         3H
        H c d e      7.9–8.8 (m)      6H
```

Proton decoupling at 8.22 τ (tau) resulted in no simplification of the 4.85 multiplet.

$C_{10}H_{16}O_2Cl_4$ requires: C, 38.7%; H, 5.20%; Cl, 45.7%. Found: C, 37.3%; H, 5.06%; Cl, 47.7%.

2,3,7,8-tetrachloro-1-octyl acetate

Peak C was separated by solid liquid chromatography followed by preparative gas liquid chromatography. Mass spectral analysis was consistent with the formula $C_{10}H_{16}O_2Cl_4$. The nuclear magnetic resonance spectrum of 2,3,7,8-tetrachloro-1-octyl acetate in $CDCl_3$ was as follows:

```
         a     b c   d e f g  h       i
        CH₂ClCHClCH₂CH₂CH₂CHClCHClCH₂OCOCH₃
                     τ (tau)          Area
        H h          5.5 (m)          2H
        H a b f g    5.5–6.6 (m)      5H
        H i          7.89 (s)         3H
        H c d e      7.7–8.8 (m)      6H
```

$C_{10}H_{16}O_2Cl_4$ requires: C, 38.7%; H, 5.20%; Cl, 45.7%; MW, 310. Found: C, 38.7%; H, 4.99%; Cl, 46.8%; Mol. Wt. 325.

As can be seen from this Example, the process also results in the formation of the 2-ester besides the 1- and/or 3-esters.

EXAMPLE 2

1,7-Octadien-3-yl acetate (168g; 0.10 mole) in carbon tetrachloride (150 ml) was treated with chlorine as described in example 1 except that the chlorine was passed at 50 ml min⁻¹ for 3h. The reaction product (26.4 g) was isolated and analysed by gas liquid chromatography as described in Example 1. Three products were present in amounts greater than 5 area percent:

| GC Peak | Compound | % |
|---|---|---|
| A | 1,2,3,7,8-pentachlorooctane | 33 |
| B | 1,2,7,8-tetrachloro-3-octyl acetate | 55 |
| C | unidentified | 11 |

1,2,3,7,8-Pentachlorooctane

Peak A was separated by solid liquid chromatography. Identification was based on a comparison of its mass spectrum and its nuclear magnetic resonance spectrum with those of 1,2,3,7,8-pentachlorooctane from Example 1. They also had the same gas liquid chromatograph retention times.

1,2,7,8-tetrachloro-3-octyl acetate

Peak B was separated by solid liquid chromatography. Mass spectral analysis was consistent with the formula $C_{10}H_{16}O_2Cl_4$. The nuclear magnetic resonance spectrum of 1,2,7,8-tetrachloro-3-octyl acetate was as follows:

```
                     i
                   OCOCH₃
         a     b c   d e  |
        CH₂ClCHClCH₂CH₂CH₂CHCHClCH₂Cl
                         f g  h
                     τ (tau)          Area
        H f          4.75 (m)         1H
        H a b g h    5.6–6.7 (m)      6H
        H i          7.88 (s)         3H
        H c d e      7.7–8.8 (br)     6H
```

Proton decoupling at 8.22 τ (tau) simplified the 4.75 multiplet to a double-doublet.

$C_{10}H_{16}O_2Cl_4$ requires: C, 38.7%; H, 5.20%; Cl, 45.7%. Found: C, 38.9%; H, 5.13%; Cl, 45.4%.

EXAMPLE 3

2,7-Octadien-1-yl acetate (6.7g; 0.04 mole) was dissolved in chloroform (36 ml) containing pyridine (4 ml) and then treated with chlorine at 40 ml min⁻¹ for 57 min in the same manner as described in Example 1 except that the temperature was kept below −15°C. The reaction solution was diluted with chloroform (100 ml), washed with water, and dried over magnesium sulphate. The chloroform was removed under reduced pressure and the residue stripped as in Example 1. GLC analysis indicated that the product (10.8 g) contained 2,3,7,8-tetrachloro-1-octyl acetate (95%).

EXAMPLE 4

Tetrachlorooctyl propionates

Octadienyl propionates (91g), prepared by the reaction of butadiene with propionic acid in the presence of a palladium catalyst, were dissolved in carbon tetrachloride (200 ml). The solution was cooled below 0°C by means of an ice/salt bath and cooling coil, a slow stream of oxygen was passed through the solution, and the glass reaction vessel was covered with aluminum foil to exclude light. Chlorine gas was passed into the solution at such a rate that, with cooling, the temperature did not rise above 0°C. The end of the reaction was signalled by a drop in temperature of the reaction solution. The reaction solution was washed with aqueous sodium thiosulphate solution, sodium carbonate solution, water, and dried over magnesium sulphate. Removal of the carbon tetrachloride under reduced pressure gave tetrachlorooctyl propionates (154g) as an oil.

$C_{11}H_{18}O_2Cl_4$ requires: C, 38.7%; H, 5.2%; Cl, 45.8%; MW 310. Found: C, 37.2%; H, 4.7%; Cl, 46.9%; MW 333.

What is claimed is:

1. An ester of a linear $C_8$ alcohol of the general formula:

$$Z(CH_2)_3.Z^1.CH_2.O.CO.R$$

or $$Z(CH_2)_3.CH(Z).O.CO.R$$

wherein

Z is $XCH_2.CHX-$, $Z^1$ is $-CHX.CHX-$,

X is Cl or Br, and

R is hydrogen, lower alkyl of 1–6 carbon atoms or halogenated lower alkyl of 1–6 carbon atoms.

2. The compound of claim 1, wherein R is hydrogen.

3. The compound of claim 1, wherein R is lower alkyl of 1–6 carbon atoms.

4. The compound of claim 1, wherein R is hydrogen or alkyl of one to three carbon atoms.

5. 2,3,7,8-tetrachloro-1-octyl propionate.

6. 2,3,7,8-tetrachloro-1-octyl acetate.

7. 1,2,7,8-tetrachloro-3-octyl acetate.

* * * * *